(12) United States Patent
Baldasarre et al.

(10) Patent No.: US 6,916,418 B2
(45) Date of Patent: Jul. 12, 2005

(54) ASSEMBLY AND METHOD FOR PURIFYING WATER AT A POINT OF USE AND APPARATUS AND METHOD FOR TESTING SAME

(75) Inventors: Thomas J. Baldasarre, Mansfield, MA (US); Kushal K. Talukdar, Wayland, MA (US); George E. Anderson, Barrington, RI (US); William M. Pozzo, North Easton, MA (US)

(73) Assignee: Harris Acoustic Products Corporation, E. Walpole, MA (US)

( * ) Notice: Subject to any disclaimer, the term of this patent is extended or adjusted under 35 U.S.C. 154(b) by 32 days.

(21) Appl. No.: 10/383,197

(22) Filed: Mar. 6, 2003

(65) Prior Publication Data

US 2003/0173307 A1 Sep. 18, 2003

Related U.S. Application Data

(60) Provisional application No. 60/364,014, filed on Mar. 13, 2002.

(51) Int. Cl.[7] .................................................. C02F 1/36
(52) U.S. Cl. ..................... 210/205; 422/186; 204/158.2
(58) Field of Search ................................ 210/748, 764, 210/198.1, 205; 96/389; 422/20, 186; 204/157.15, 158.2; 435/173.7; 99/451

(56) References Cited

U.S. PATENT DOCUMENTS 3,464,672 A * 9/1969 Massa ......................... 366/115
3,672,823 A * 6/1972 Boucher ....................... 422/20
4,211,744 A   7/1980 Boucher
5,395,592 A * 3/1995 Bolleman et al. ............ 422/128
5,531,157 A   7/1996 Probst
5,611,993 A * 3/1997 Babaev ........................ 422/20
5,658,534 A * 8/1997 Desborough et al. ........ 422/128
6,071,473 A * 6/2000 Darwin ........................ 422/20
6,506,584 B1  1/2003 Chandler et al.
6,547,935 B2 * 4/2003 Scott ....................... 204/157.15
6,674,216 B2  1/2004 Christensen
2002/0164274 A1 * 11/2002 Haggett et al. ............. 422/128

FOREIGN PATENT DOCUMENTS

GB             2306202 A   *   4/1997

* cited by examiner

Primary Examiner—Frank M. Lawrence
(74) Attorney, Agent, or Firm—Pandiscio & Pandiscio; Scott R. Foster

(57) ABSTRACT

A cavitation assembly for purification of drinking water includes a generally cylindrically-shaped open-ended tube for flow of water therethrough, the tube comprising a transducer for converting electrical energy to acoustic energy and transmitting ultrasound through the water in the tube to induce cavitation in the water in the tube. A water moving means flows the water through the tube, and an electrical power source provides electrical power to the tube. The cavitation inactivates microorganisms in the water.

12 Claims, 5 Drawing Sheets

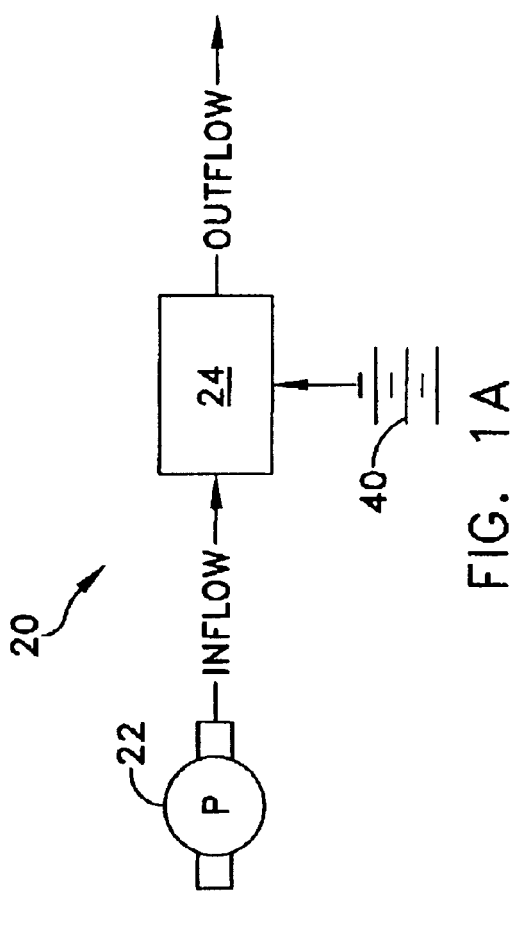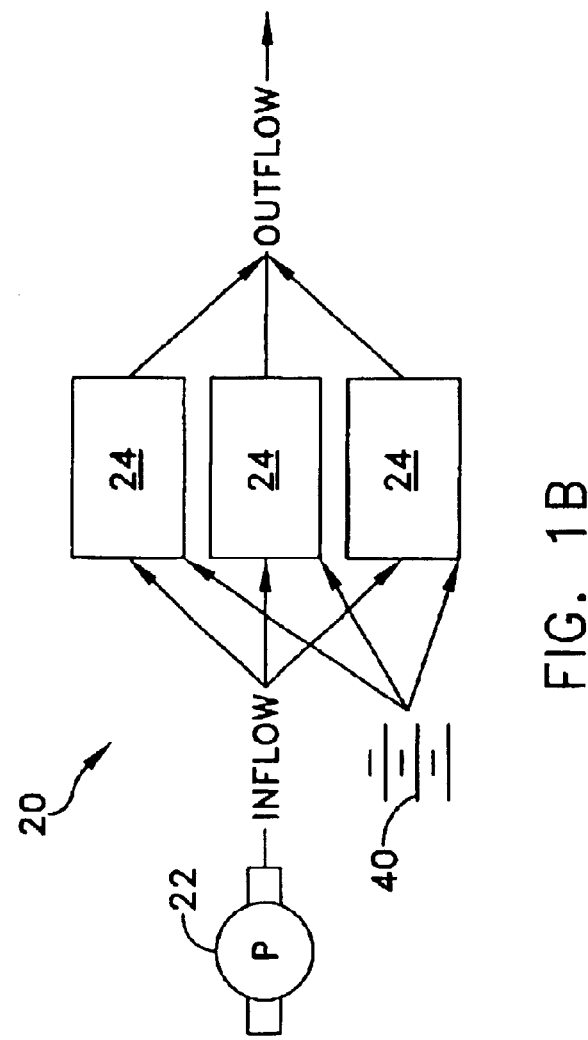

ASSEMBLY AND METHOD FOR PURIFYING WATER AT A POINT OF USE AND APPARATUS AND METHOD FOR TESTING SAME

CROSS-REFERENCE TO RELATED APPLICATION

This application claims the benefit of U.S. Provisional Patent Application Ser. No. 60/364,014, filed Mar. 13, 2002, in the names of Robert F. Carlson, Thomas J. Baldasarre, and Kushal K. Talukdar.

BACKGROUND OF THE INVENTION

1. Field of the Invention

The invention relates to the purification of drinking water and is directed more particularly to an assembly for effecting purification at the point of use.

2. Description of the Prior Art

Attention has been focused on enhancing the safety of drinking water. Federal standards for bacteriological quality in drinking water have evolved steadily since the beginning of the last century, culminating in the Safe Water Drinking Act of 1974 and two significant amendments thereto, in 1986 and 1996. Over the years, domestic public water systems have improved the standards under which they operate, and water at the point of entry (POE) of distribution has generally been considered safe.

However, in recent years the public attitude toward the quality of the water supply at the POE has shifted. According to a 1999 survey by the Water Quality Association, one in five households was dissatisfied with the quality of their water supply. Better methods of pathogen detection, failing infrastructures in some communities, and concerns about the chemicals used in the treatment of water, are a few of the reasons. Drinking water quality is a special concern for Americans living in rural areas, where some waterborne pathogens are commonly found. Research has shown an abundance of *Cryptosporidium* and *Giardia* on dairy farms, both in the U.S. and abroad. Many rural communities do not have a large public water system and are vulnerable to waterborne pathogens.

Therefore, it is important to ensure the safety of drinking water from micro-organisms at the individual household levels, or point of use (POU). Events of Sep. 11, 2001, and the consequent "war on terrorism", have further caused the shift in public thinking relative to the safety of Americans, both at home and abroad.

From the ground or surface water, delivery of drinking water to the consumer takes three main routes. First, municipalities undertake the task of purifying the water and supplying it to the consumers. Secondly, consumers use their own wells or other techniques for obtaining water. Lastly, commercial bottled water companies produce pure drinking water using either water from municipalities or water from other direct sources.

As a result of increased pathogen detection, and bio-terrorism threats, along with a general lack of funding for upgrading municipal water supplies, consumers are increasingly exploring the safe drinking water options. According to the 2001 Water Quality Association national survey, the percentage of U.S. population with home water treatment devices has increased from 27% in 1995 to 41% in 2001. It is estimated that more than ten million households will be looking for further enhancements of their drinking water for pathogen removal. The key providers in this market are water filtration companies using reverse osmosis or other nano-filtration technologies. However, there are many commercial water purification products in the market. Typically, they employ a combination of chemical, ultra violet (UV) radiation, ozonation, and filtration treatments in order to achieve maximum effectiveness, inasmuch as one method alone does not ensure protection against all microorganisms.

Waterborne organisms of concern can be classified by their size (Table 1).

TABLE 1

Relative Size of Waterborne Micro-Organisms

| Micro-organisms | Approximate size (in microns) | Examples |
| --- | --- | --- |
| Viruses | 0.002–0.5 | Hepatitis, 0027 micron Meningitis, .2 micron |
| Bacteria, cocci (spherical) and bacilli (rod-shaped) | 0.5–1.5 | Pseudomonas, 0.5–0.62 micron *Vibrio cholerae*, 1 micron |
| Protozoa | 2–15 | *Giardia lamblia*, 9–12 micron Cryptosporidium, 4–6 micron |

Most of the commercial and industrial devices for water purification in use today employ a combination of techniques classified in five main categories. Their application areas, principles of operation, effects on surviving microorganisms, and limitations of the processes are shown in Table 2.

TABLE 2

Summary of Different Water Treatment Processes

| Treatment | Done at | Operating Principle | Effect on survivors | Limitations |
| --- | --- | --- | --- | --- |
| Ultraviolet | POU | mutagen | Interference with DNA replication | Limited impact on hard-shelled micro-organisms |
| Chlorination | POE/POU | Production of Hypochlorous acid that kills microbial pathogens | Evolution of resistant bacterial cells from the fittest survivors | chlorination by-products, not effective against C. parvum |
| Thermal | POU | denaturation of proteins | lethal above certain temperature (usually 65°) | Requires high input of energy to raise the temperature to sufficient level |
| Filtration | POU | Separates the microbes from the water based on their sizes | None | Flow rates, maintenance |

TABLE 2-continued

Summary of Different Water Treatment Processes

| Treatment | Done at | Operating Principle | Effect on survivors | Limitations |
|---|---|---|---|---|
| Ozonation | POU/POE | oxidation of cell walls, damage to nucleic acid | oxidation | Complex generation process, Need to eliminate residual gases that may be toxic |

It is clear that while all the techniques are effective to a certain extent, they have limitations in terms of operations, resistance of certain pathogens, and creation of toxic by-products. It is desirable to have a device that is effective against all kinds of microorganisms and will not generate toxic by-products.

Acoustic "cavitation" fills this need and is an ideal supplement to existing processes. Recent work has confirmed this by demonstrating that cavitation is effective in destroying *E. coli* and *L. pneumophila*. Cavitation is the phenomenon of creation in implosion of microscopic bubbles in a fluid and is caused by rapid changes in the fluid pressure. The primary mechanism of inducing the rapid change in pressure is transmission of ultrasound in the fluid. The sound is created either by a piezoelectric or magnetostrictive transducer. Coupling a sound transducer to the fluid medium and driving the transducer with sufficient power creates the alternating pressure cycle that induces cavitation.

The parameters that affect cavitation are input energy transmitted in the medium, frequency of the sound, number of sound pulses, and the ambient pressure of the fluid. Typically, the higher the frequency, the greater is the cavitation threshold and the smaller the bubble size There are three distinct stages associated with cavitation:

1. Nucleation—Cavitation bubbles are formed in this stage.
2. Bubble growth—The bubbles grow in this stage by absorbing energy from the alternating compression and expansion caused by ultrasound.
3. Implosion—In this stage the growing bubble reaches a critical size and implodes upon itself, because it cannot absorb any more energy.

In the implosion stage, very high local temperatures and shearing forces are produced. This shear force and high temperatures are utilized in a number of applications designed for cleaning (acoustic cleaners) and homogenizing tissue samples (sonicators).

There is a need for a water cavitation assembly which is relatively simple and of inexpensive construction, easy to operate, and which can easily be installed in drinking water systems at points of use.

Further, in view of the continuing necessity for proper functioning of the purifying assembly, there is a need for a simple, easy to use, and inexpensive test apparatus and method, to facilitate quick and easy testing of the purifying assembly on a high frequency basis.

SUMMARY OF THE INVENTION

An object of the invention is, therefore, to provide a robust cavitation assembly for the purification of drinking water at the POU.

A further object of the invention is to provide a method for purifying water by acoustic cavitation thereof.

A further object of the invention is to provide a reliable, but inexpensive and easy to use apparatus and method for measuring the performance of the aforementioned assembly.

With the above and other objects in view, a feature of the present invention is the provision of a cavitation assembly for purification of drinking water. The assembly comprises a generally cylindrically-shaped open-ended tube for flow of water therethrough, the tube comprising a transducer for converting electrical energy to acoustic energy and transmitting ultrasound through the water in the tube to induce cavitation in the water in the tube. A water moving means is provided for flowing the water through the tube, and an electrical power source is provided for providing electrical power to the tube. The cavitation induced in the water inactivates microorganisms in the water.

In accordance with a further feature of the invention, there is provided a cavitation assembly which comprises a generally cylindrically-shaped open-ended tubular housing for flow of water therethrough, an annular fiberglass layer disposed coaxially in the housing and spaced from the housing, a cylindrically-shaped non-toxic open-ended tube disposed coaxially in the fiber glass layer and spaced from the fiberglass layer, and defining an internal passageway for the flow of water. Ceramic rings are disposed between the fiberglass layer and the non-toxic tube, and isolation rings are disposed between adjacent ones of the ceramic rings.

In accordance with a further feature of the invention, there is provided a method for purifying drinking water, the method comprising the steps of flowing the drinking water through a generally cylindrically-shaped open-ended tube comprising a transducer for converting electrical energy to acoustic energy, and providing electrical power to the transducer to generate ultrasound and transmit the ultrasound through the water in the tube to induce cavitation in the water in the tube, wherein the cavitation operates to inactivate microorganisms in the water.

In accordance with a still further feature of the invention, there is provided a method for purifying drinking water comprising the steps of flowing the drinking water through a generally cylindrically-shaped open-ended non-toxic tube having ceramic rings mounted thereon, providing electrical power to the ceramic rings to generate ultrasound, and transmitting the ultrasound through the water in the tube to induce cavitation in the water in the tube, whereby to inactivate microorganisms in the water.

In accordance with a still further feature of the invention, there is provided a method for purifying drinking water, comprising flowing the water through a generally cylindrically-shaped open-ended tubular housing having an annularly-shaped fiberglass layer disposed coaxially therein and spaced from the housing, and having ceramic rings disposed adjacent the fiberglass layer and disposed inwardly thereof, and providing electrical power to the ceramic rings to vibrate the rings to generate ultrasound, and transmitting the ultrasound through the water to induce cavitation in the water in the housing, wherein the cavitation in the water serves to inactivate microorganisms in the water.

In accordance with a still further feature of the invention, there is provided an apparatus for measuring performance of a drinking water cavitation assembly for purification of water, the assembly being adapted to receive a cavitation unit in which ultrasound is transmitted through the water in the assembly to induce cavitation in the water to inactivate microorganisms present therein. The performance measuring apparatus comprises a first housing having an inlet for receiving water and an outlet adapted to receive an open first end of the cavitation assembly, the first housing being adapted to channel water flowing from the first housing inlet to the first housing outlet and thereby to the cavitation assembly open first end. A light source is disposed in the first housing and a first substantially parabolic reflector is disposed in the first housing to direct light from the light source along a central axis of the first housing outlet and thereby along a central axis of the cavitation assembly. A second housing is opposed to the first housing, the second housing having a water outlet and having an inlet in alignment with the first housing outlet. A second substantially parabolic reflector is mounted in the second housing and is aligned with the first reflector, the second reflector having a photoresistor mounted at a focal point thereof for converting incident light to an electrical resistance. A digital voltmeter continually registers resistance at the photoresistor, and a display means effects a display of values indicated by the digital voltmeter, such that the attenuation of light from the light source because of the formation of air bubbles in the water is observable and the extent of cavitation thereby determined.

In accordance with a still further feature of the invention, there is provided a method for measuring performance of a drinking water cavitation assembly for purification of water, the assembly comprising a cavitation unit in which ultrasound is transmitted through water in the assembly to induce cavitation in the water to inactivate microorganisms present therein, the method comprising the steps of subjecting water in the cavitation assembly to light from a light source removed from a first end of the assembly and directed toward a central portion of the assembly, receiving light from the light source in a substantially parabolic reflector disposed in a second end of the assembly and having a photoresistor mounted at a focal point thereof for converting light received from the light source to electrical resistance, and observing a display means which effects values indicated by a computer, which values are generated by a digital voltmeter registering resistance at the photoresistor, to determine the extent of light penetration of the water undergoing cavitation, to determine the extent of the cavitation.

The above and other features of the invention, including various novel details of construction and combinations of parts will now be more particularly described with reference to the accompanying drawings and pointed out in the claims. It will be understood that the particular assembly embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which are shown illustrative embodiments of the invention, from which its novel features and advantages will be apparent.

In the drawings:

FIGS. 1A and 1B are diagrammatic flow charts illustrating use of the assembly singly and in groups;

DESCRIPTION OF THE PREFERRED EMBODIMENTS

Figure 2:
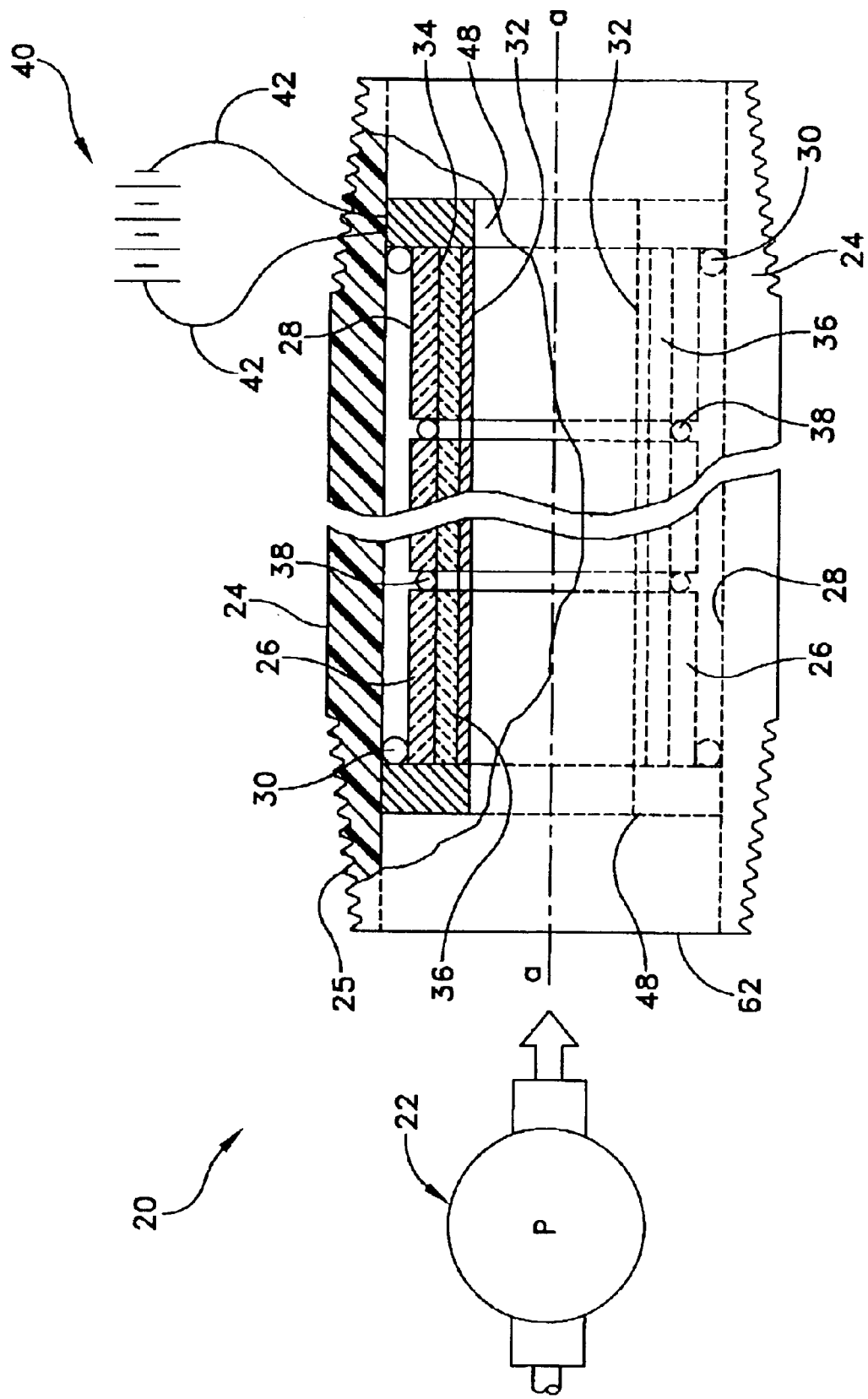
FIG. 2 is a partly sectional view of a transducer portion of the assembly.

For water purification, piezoelectric ceramic ring transducers are ideally suited for their ability to focus sound resulting in an efficient cavitation system. As shown in FIG. 1, they can be readily adapted to piping systems for individual household usage and can be scaled up by parallel connections for larger dwellings/buildings to meet the demands of the facility. Once an individual acoustic cavitation chamber is provided for an appropriate flow rate and is demonstrated to be effective, a multiplicity of like cavitation chambers can be combined to provide the necessary flow rate for bigger installations.

An illustrative drinking water acoustic cavitation assembly 20 includes a water moving means, such as a pump 22, for providing a suitable flow rate for a particular site. The assembly 20 further includes a generally cylindrically-shaped open-ended tubular housing 24 for flow of water therethrough. The housing 24 may be of metal, PVC, or a composite. It may be provided with threads 25, internal or external, or quick-connect and disconnect connectors for insertion and ready removal from a water pipe. An annularly-shaped fiberglass wrap 26 is disposed coaxially in the housing 24 and is spaced from the housing to form an annular chamber 28. O-rings 30 are disposed in the chamber 28 and abut the housing 24 and the fiberglass wrap 26 and serve to seal the chamber 28 against migration of water thereinto.

A cylindrically-shaped non-toxic open ended tube 32 is disposed coaxially in the fiberglass wrap 26 and is spaced inwardly therefrom. The non-toxic tube 32 preferably is of a metal or composite material. The non-toxic tube 32 and the fiberglass layer 26 define an annular space 34 in which are disposed ceramic rings 36. In manufacture, the fiberglass wrap 26 is applied to the outer surface of the ceramic rings 36, to pre-stress the ceramic rings, as is known in the art. The ceramic rings 36 are separated by isolation rings 38.

Figure 3:
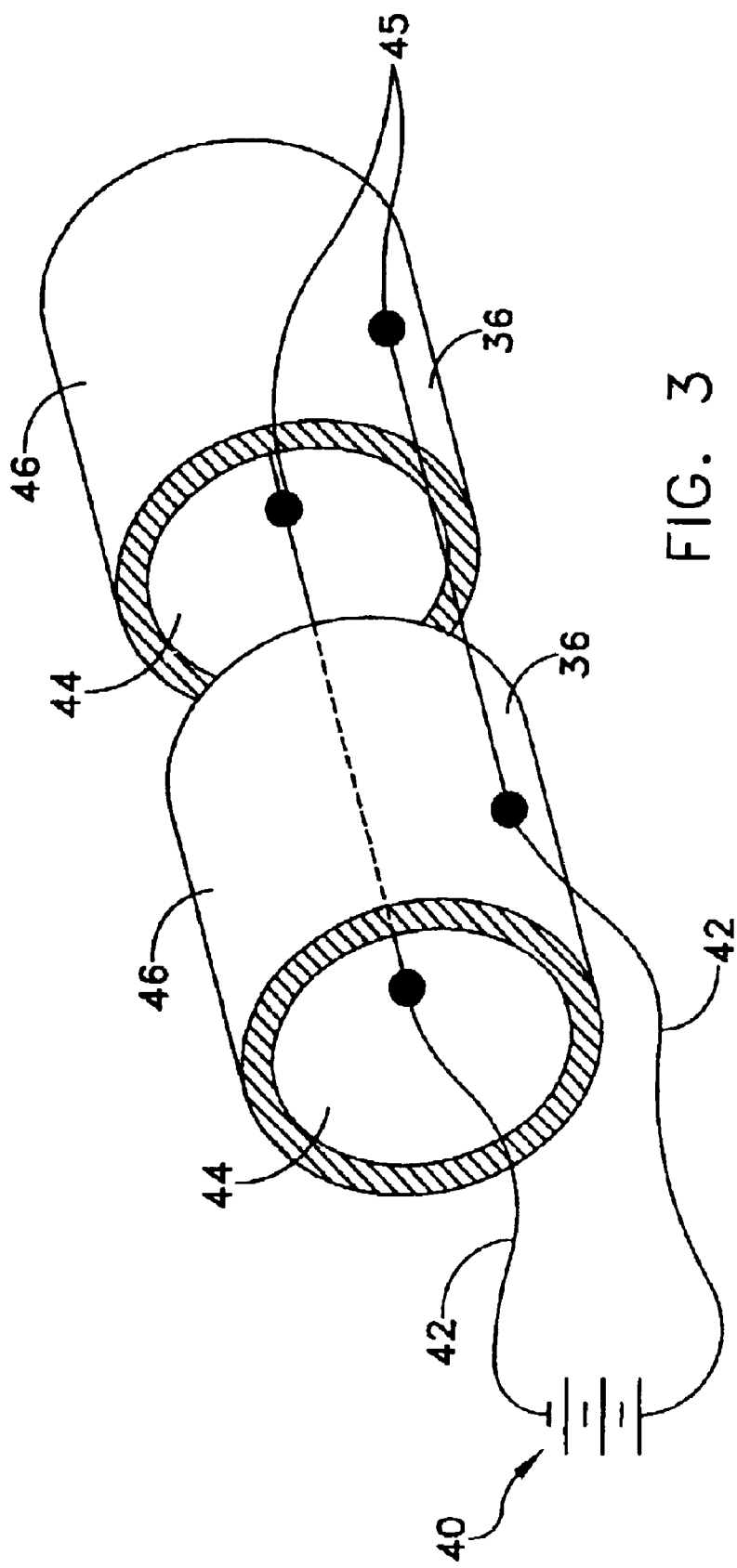
FIG. 3 is a perspective view of a portion of the assembly of FIG. 2.

The assembly 20 includes a power source 40 which provides power through electrically conductive lines 42 to inside and outside surfaces 44, 46 (FIG. 3) of the ceramic rings 36. The surfaces 44, 46 are coated with silver plate and the wires 42 are soldered to the silver) plate as at points 45. The ceramic rings are driven in parallel. Power is applied by way of an alternating voltage operating close to the natural frequency of the ceramic rings to achieve maximum vibration, and hence, maximum cavitation.

The ceramic rings 36 are selected to match a targeted frequency within a range of ultrasonic frequencies of about 30–200 kHz. Ideally, the cavitation field should be uniform within the cylinder so that any micro-organism passing through the cylinder will experience the same dose of cavitation. However, the ceramic geometries and the superposition of different frequencies may alter the distribution. Since cavitation is associated with bubble formation and collapsing bubbles produce sound, places with higher bubble concentration will have a higher local sound level. The ceramic rings 36 may contain ceramics of different frequencies, wherein each ring vibrates at a different frequency.

The ends of the annular chamber 28 and the annular space 34 are closed by epoxy ribs 48.

A preferred embodiment of the assembly includes a 1.5 inch OD×2.0 inch long piezoelectric ceramic ring assembly encased within a PVC housing with inlet and outlet connections for hose attachments for water flow.

In use of the assembly 20, water proximate the POU is flowed through the cylindrically-shaped non-toxic tube 32 disposed within the ceramic rings 36 which, in turn, are wrapped with the fiberglass 26, all disposed within the generally cylindrically-shaped open-ended tubular housing 24. The water is flowed typically by a pump 22, but may be flowed by any means normally used in the system of concern, such as by gravity from a roof-top tank, or the like.

Such assemblies may be used as acoustic cavitation devices for inactivation of protozoa, bacteria and viruses. The cylinders can be plumbed to existing water pipes and activated only when water flow is detected. The advantages of such an acoustic cavitation purifier are two-fold: (1) it enhances the effectiveness of existing POU water treatments, and (2) it can be scaled up to serve the needs of a larger number of water consumers. The projected costs of such individual devices, less the water flow means and electrical power source, is quite low, less than U.S. $100 per point of use.

It will be apparent that many benefits can be derived from the invention. A principal advantage of this concept is its flexible nature. It can provide an additional level of security and robustness to already installed devices, or on its own it can be effective against a wide variety of pathogens, and reduce the need for chemical treatment of water. Potential application areas for small units are in the main water supply lines of single-family homes or on individual faucets. Scaled up bigger units can be used for enterprise level applications.

The advantages of "acoustic cavitation" over other types of water purification processes (as summarized in Table 2) include, working in conduction with the other processes, reduction of the need for chlorine or other chemical compounds, and breaching the shells of micro-organisms for better effectiveness of ultraviolet or ozonation treatments. Operating individually, the system offers advantages, such as simpler operation opposed to ozonation, robust operation of the ceramics, and elimination of the need for periodic change of filters.

Figure 4:
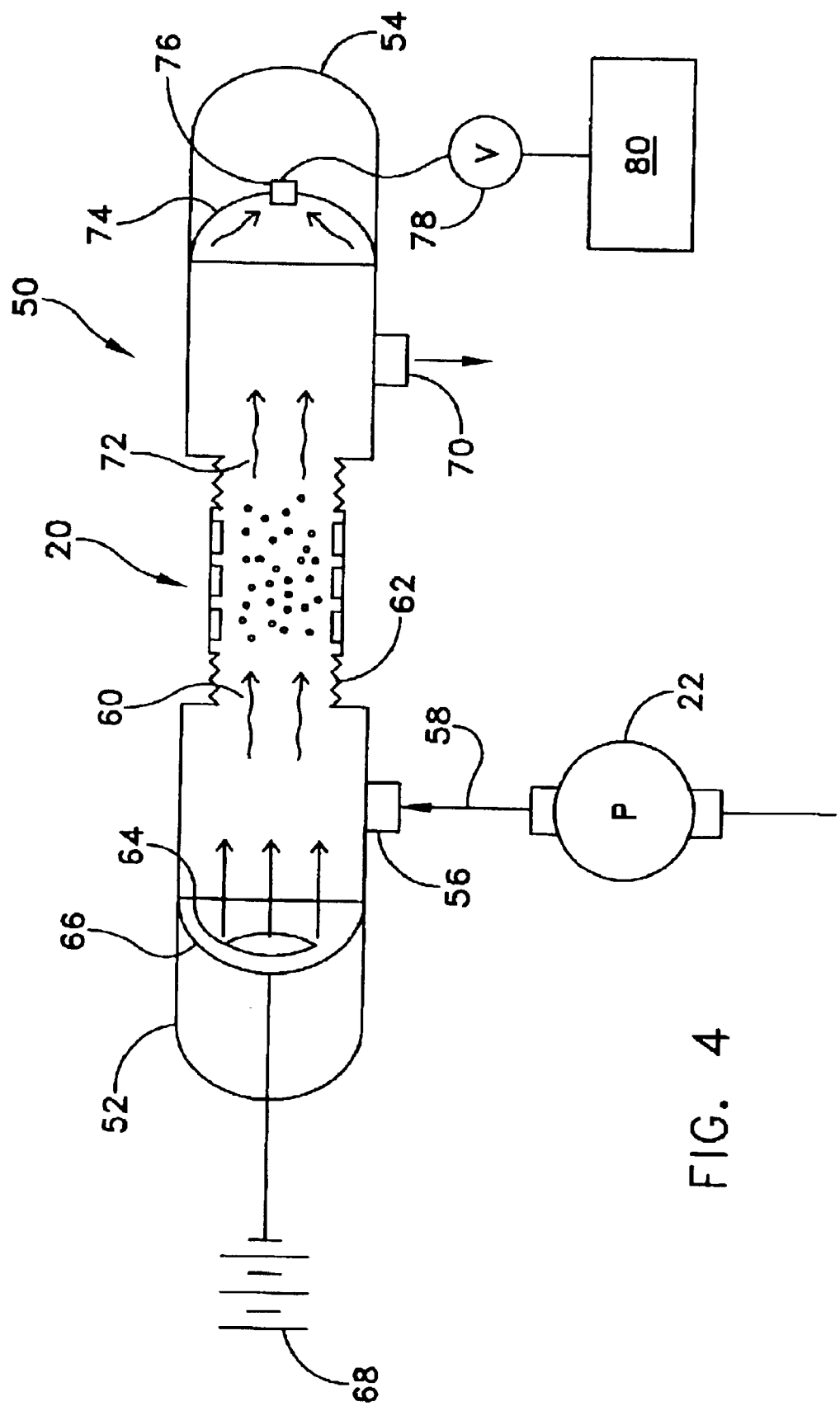
FIG. 4 is a diagrammatic illustration of an apparatus for measuring the performance of the assembly of FIG. 2.

A further feature of the invention is the provision of an apparatus 50 (FIG. 4) for measuring the performance of the above-described cavitation assembly 20. The apparatus 50 includes first and second opposed housings 52, 54, preferably of PVC, and adapted to receive the cavitation assembly 20 therebetween.

The first housing 52 is provided with an inlet 56 for connection to a water line 58 receiving water from the pump 22 or other water providing means. The first housing 52 is further provided with an outlet 60 which is adapted to receive an open first end 62 of the cavitation assembly 20. The first housing 52 is adapted to channel water from the inlet 56 to the outlet 60 and thereby to the cavitation assembly open first end 62.

A light source 64 is disposed in the first housing 52 and a first substantially parabolic reflector 66 is mounted in the first housing to direct light from the light source 64 along a central axis of the first housing outlet 60 and, thereby, along a central axis a—a of the cavitation assembly 20. The light source 64 is powered by a power source 68 outside the housing 52.

The second housing 54 is provided with a water outlet 70 and with an inlet 72 in alignment with the first housing outlet 60.

A second substantially parabolic reflector 74 (FIGS. 4 and 4A) is mounted in the second housing 54 and is aligned with the first reflector 66. The second reflector 74 is provided with a photoresistor 76, preferably of cadmium sulphide, mounted at a focal point of the second reflector. The second reflector 74 focuses incident light toward the focal point thereof and the photoresistor 76 converts the light to electrical resistance, depending upon the intensity of the light.

A digital voltmeter 78 continually registers the resistance at the photoresistor and a display means 80, typically a computer, effects a display or readout of the values indicated by the voltmeter. The cavitation in the water is caused by bubbles which attenuate the light from the light source 64. The greater the attenuation, the less the light intensity reaching the photoresistor 76 and the less the voltmeter registration and display values.

Figure 4B:
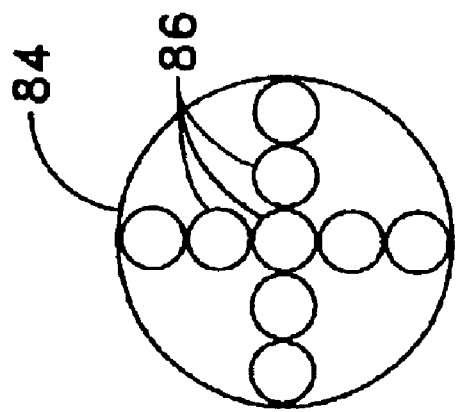
FIG. 4B is similar to FIG. 4A, but illustrative of an alternative embodiment.
Figure 4A:
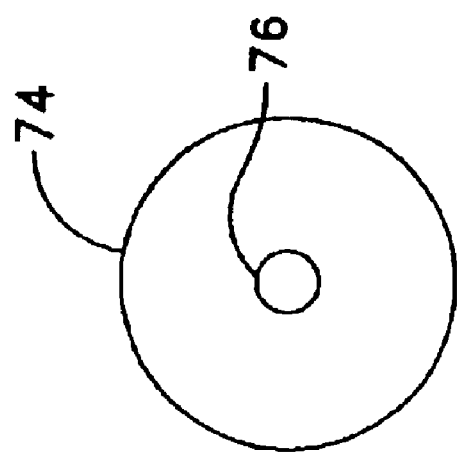
FIG. 4A is an elevational depiction of a portion of the apparatus of FIG. 4.

In an alternative arrangement, shown in FIG. 4B, rather than the second reflector 74 and the single photoresistor 76 at the focal point of the reflector, there is provided a disc 84 with a plurality of photoresistors 86 mounted thereon. In this embodiment, zones of different intensities can be identified.

Thus, it is an easy matter to check the proficiency of a cavitation assembly.

Each POU may be provided with a measurement apparature 50, or a single measurement apparatus can be used to check any number of cavitation assemblies inserted into it.

There is thus provided an acoustic cavitation assembly, of low cost and easy operation, for purifying drinking water at the POU, and further, an apparatus for checking the proficiency of the cavitation assembly.

It will be understood that many additional changes in the details, materials, steps and arrangement of parts, which have been herein described and illustrated in order to explain the nature of the invention, may be made by those skilled in the art within the principles and scope of the invention as expressed in the appended claims.

What is claimed is:

1. A cavitation assembly for purification of drinking water, the assembly comprising:

a generally cylindrically-shaped open-ended tube for flow of water therethrough, said tube comprising rings of ceramic material, and comprising a piezoelectric transducer for converting electrical energy to acoustic energy and transmitting ultrasound through the water in the tube to induce cavitation in the water in the tube;

wherein said transducer is adapted to operate at ultrasonic frequencies of about 30–200 kHz;

a water moving means for flowing the water through said tube; and an electrical power source for providing electrical power to said tube;

wherein the cavitation inactivates microorganisms in the water; and wherein said rings are of different ceramic materials and adapted to operate at different ones of the frequencies.

2. A cavitation assembly for purification of drinking water, the assembly comprising:

a generally cylindrically-shaped open-ended tubular housing for flow of water therethrough;

an annularly-shaped fiberglass layer disposed coaxially in said housing and spaced from said housing;

a cylindrically-shaped non-toxic open-ended tube disposed coaxially in said fiber glass layer and spaced from said fiberglass layer, and defining an internal passageway for the flow of water;

ceramic rings disposed between said fiberglass layer and said non-toxic tube;

isolation rings disposed between adjacent ones of said ceramic rings; and an electrical power source for electrical excitation of said ceramic rings for effecting cavitation of water in said assembly.

3. The cavitation assembly in accordance with claim 2 wherein said non-toxic tube is of a selected one of metal and composite material.

4. The cavitation assembly in accordance with claim 2 and further comprising means for flowing water through the assembly.

5. The cavitation assembly in accordance with claim 2 wherein said tubular housing is of a selected one of metal, PVC, and composite materials.

6. A cavitation assembly for purification of drinking liquids, the assembly comprising:

a generally cylindrically-shaped open-ended tube for flow of liquid therethrough, said tube comprising rings of ceramic material, and comprising a piezoelectric transducer for converting electrical energy to acoustic energy and transmitting ultrasound through the liquid in the tube to induce cavitation in the liquid in the tube, wherein said transducer is adapted to operate at ultrasonic frequencies of about 30–200 kHz;

a liquid moving means for flowing the liquid through said tube; and an electrical power source for providing electrical power to said tube;

wherein the cavitation inactivates microorganisms in the liquid; and wherein said rings are of different ceramic materials and adapted to operate at different ones of the frequencies.

7. A cavitation assembly for purification of drinking liquids, the assembly comprising:

a generally cylindrically-shaped open-ended tubular housing for flow of liquid therethrough;

an annularly-shaped fiberglass layer disposed coaxially in said housing and spaced from said housing;

a cylindrically-shaped non-toxic open-ended tube disposed coaxially in said fiber glass layer and spaced from said fiberglass layer, and defining an internal passageway for the flow of liquid;

ceramic rings disposed between said fiberglass layer and said non-toxic tube;

isolation rings disposed between adjacent ones of said ceramic rings; and an electrical power source for electrical excitation of said ceramic rings for effecting cavitation of liquid in said assembly.

8. The cavitation assembly in accordance with claim 7 and further comprising means for flowing liquid through the assembly.

9. A cavitation assembly for purification of drinking water, the assembly comprising:

a generally cylindrically-shaped open-ended tube for flow of water therethrough, said tube comprising rings of ceramic material forming a transducer for converting electrical energy to acoustic energy and transmitting ultrasound through the water in the tube to induce cavitation in the water in the tube;

a water moving means for flowing the water through said tube; and an electrical power source for providing electrical power to said tube;

wherein the cavitation inactivates microorganisms in the water; and wherein said rings are of different ceramic materials and adapted to operate at different frequencies.

10. A cavitation assembly for purification of drinking liquids, the assembly comprising:

a generally cylindrically-shaped open-ended tube for flow of liquid therethrough, said tube comprising rings of ceramic material forming a transducer for converting electrical energy to acoustic energy and transmitting ultrasound through the liquid in the tube to induce cavitation in the liquid in the tube;

a liquid moving means for flowing the liquid through said tube; and an electrical power source for providing electrical power to said tube;

wherein the cavitation inactivates microorganisms in the liquid; and wherein said rings are of different ceramic materials and adapted to operate at different frequencies.

11. A cavitation assembly for purification of drinking liquid, the assembly comprising:

a generally cylindrically-shaped open-ended tubular housing;

an annularly-shaped fiberglass layer disposed coaxially in said housing and spaced from said housing;

a cylindrically-shaped non-toxic open-ended tube disposed coaxially in said fiber glass layer and spaced from said fiberglass layer, and defining an internal passageway for the flow of liquid therethrough;

ceramic rings disposed between said fiberglass layer and said non-toxic tube; and an electrical power source for electrical excitation of said ceramic rings for effecting cavitation of liquid in said assembly.

12. A cavitation assembly for purification of drinking liquid, the assembly comprising:

a generally cylindrically-shaped open-ended tube for flow of liquid therethrough, said tube comprising rings of ceramic material, and comprising a transducer adapted to operate at ultrasonic frequencies for converting electrical energy to acoustic energy and transmitting ultrasound through the liquid in the tube to induce cavitation in the liquid in the tube;

wherein said rings are disposed in a void chamber sealed against inflow of liquid;

a liquid moving means for flowing the liquid through said tube; and an electrical power source for providing electrical power to said tube;

wherein the cavitation inactivates microorganisms in the liquid.

* * * * *